US012552236B2

(12) United States Patent
Haberl et al.

(10) Patent No.: US 12,552,236 B2
(45) Date of Patent: Feb. 17, 2026

(54) AUTOMOTIVE PANEL

(71) Applicant: AUTONEUM MANAGEMENT AG, Winterthur (CH)

(72) Inventors: Johannes Haberl, Zürich (CH); Radim Rehacek, Buchs (CH)

(73) Assignee: AUTONEUM MANAGEMENT AG, Winterthur (CH)

( * ) Notice: Subject to any disclaimer, the term of this patent is extended or adjusted under 35 U.S.C. 154(b) by 346 days.

(21) Appl. No.: 17/759,584

(22) PCT Filed: Jan. 28, 2021

(86) PCT No.: PCT/EP2021/051987
§ 371 (c)(1),
(2) Date: Jul. 27, 2022

(87) PCT Pub. No.: WO2021/170337
PCT Pub. Date: Sep. 2, 2021

(65) Prior Publication Data
US 2023/0093457 A1  Mar. 23, 2023

(30) Foreign Application Priority Data
Feb. 25, 2020 (EP) .................... 20159397

(51) Int. Cl.
*B29C 70/50* (2006.01)
*B29C 70/46* (2006.01)
(Continued)

(52) U.S. Cl.
CPC .............. *B60K 1/04* (2013.01); *B29C 70/465* (2013.01); *C08J 5/043* (2013.01); *H01M 50/20* (2021.01);
(Continued)

(58) Field of Classification Search
CPC ................. B29C 64/147; B29C 64/118; B29C 2043/026; B29C 70/523; B29C 70/465;
(Continued)

(56) References Cited

U.S. PATENT DOCUMENTS 3,000,144 A * 9/1961 Kitson .................... E04C 2/205
52/592.1
3,993,726 A * 11/1976 Moyer .................. B29B 15/122
264/171.12
(Continued)

FOREIGN PATENT DOCUMENTS

KR        20160085384 A    2/2019
WO          2019111224 A1   6/2019

OTHER PUBLICATIONS

Greco, R. and A. Sorrentino, Polycarbonate/ABS Blends: A Literature Review, Advances in Polymer Technology, vol. 13, No. 4 (1994), pp. 249-258. (Year: 1994).*
(Continued)

*Primary Examiner* — Matthew J Daniels
(74) *Attorney, Agent, or Firm* — FisherBroyles, LLP; Craig W. Mueller

(57) ABSTRACT

Method for producing an automotive panel with the steps of (a) providing a first extrudate of polycarbonate and additives (mixture A), and providing endless filament glass rovings (Component C), (b) feeding mixture A, and component C into the main extruder, and forming a final extrudate, (d) compression moulding the final extrudate into an automotive panel whereby a second mixture of polycarbonate and a short length glass fibers (mixture B) is fed together with mixture A and component C.

16 Claims, 3 Drawing Sheets

(51) Int. Cl.
*B60K 1/04* (2019.01)
*C08J 5/04* (2006.01)
*H01M 50/20* (2021.01)

(52) U.S. Cl.
CPC ... *B60K 2001/0438* (2013.01); *C08J 2369/00* (2013.01); *H01M 2220/20* (2013.01)

(58) Field of Classification Search
CPC ....... B29C 43/16; B29C 43/183; B29C 43/02; B29C 31/08
See application file for complete search history.

(56) References Cited

U.S. PATENT DOCUMENTS

| | | | | |
|---|---|---|---|---|
| 4,044,188 | A | | 8/1977 | Segal |
| 4,207,282 | A | * | 6/1980 | Grisch .................... B29C 70/46 264/113 |
| 5,710,414 | A | * | 1/1998 | Matsen ................... B32B 37/06 219/645 |
| 5,807,914 | A | | 9/1998 | Obayashi |
| 2003/0158371 | A1 | * | 8/2003 | Akamine ................ C08G 71/04 528/196 |
| 2006/0199893 | A1 | * | 9/2006 | Schrempf ............... B29C 48/38 524/495 |
| 2007/0160822 | A1 | * | 7/2007 | Bristow .................. B29C 43/52 264/322 |
| 2012/0100414 | A1 | | 4/2012 | Sonta |
| 2012/0103714 | A1 | | 5/2012 | Choi et al. |
| 2016/0248060 | A1 | | 8/2016 | Brambrink |
| 2018/0345605 | A1 | * | 12/2018 | Escowitz ............ B29C 70/0035 |

OTHER PUBLICATIONS

Written Opinion of the International Searching Authority from parent PCT/EP2021/051987. Sep. 2, 2021. 8 pages.
International Search Report from parent PCT/EP2021/051987. Sep. 2, 2021. 4 pages.

* cited by examiner

AUTOMOTIVE PANEL

This application is a national stage application under 35 U.S.C. 371 and claims the benefit of PCT Application No. PCT/EP2021/051987 having an international filing date of Jan. 28, 2021, which designated the United States, which PCT application claims the benefit of European Patent Application No. EP20159397.7, filed Feb. 25, 2020, the disclosure of each is incorporated by reference herein.

TECHNICAL FIELD

Method for producing an automotive panel and the product derived from it as well as the use of such a panel in for instance a cover or lid for a final housing for a traction or main battery for a hybrid or battery electric vehicle.

BACKGROUND ART

Automotive panels can be made of glass fiber reinforced plastic. The mechanical impact strength of this may be dependent on the fiber length, the basic resin matrix and its related process. For larger panels, like vehicle underbody panels, the direct long fiber process is mainly used. In this process endless filament, rovings are pulled into a second extruder where the fibers are broken in long glass fibers of roughly 10-15 mm. The thus formed mass is portioned and used immediately for the compression molding of the panel. As the glass fiber length and load increase the viscosity of the material, only a maximum amount of glass can be used. Furthermore, to enable flow also a low viscosity matrix material is used. If higher viscosity matrix material is used the maximum size of the panel that can be produced with a reasonable press force is limited.

Therefore, the process is restricted to a combination of well-flowing material, such as some polypropylene grades, and long glass fibers. Typically, parts obtained from this combination are prone to high shrinkage and warping, limiting the success of this material.

To overcome some of the drawbacks an alternative process with endless glass filament strips or fabrics laid in defined directions, then covered, and impregnated with molten resin has been used for larger panels. However, these processes are time consuming and include the step of preparing a semi finished impregnated glass fiber product, making it an expensive process.

Due to the changes in the automotive manufacturing chains with the growing demand for electric vehicles. There is a need for larger panels, shells or trim parts including such a compression molded panel spanning large distances and able to withstand high impact forces as well as high temperatures.

One such an area of products where there is a need for such a panel structure is its usage as the cover or lid of a main or traction battery housing.

Main or traction batteries are built as self-standing systems and they are placed into a final housing, they may be allocated under the floor panel facing the road. The requirements for such housings are high, mainly driven by the precaution to avoid damage to the battery system, which can cause battery runaway, a chemical reaction producing very high temperature reaching beyond 1000° C. Therefore, to prevent damage the housing is predominantly formed from thick metal plates, that can withstand impact damage from flying stones or curb stones, and that are able to withstand high temperatures.

A housing is normally build with a lower casing, holding the battery system in place, and a cover or lid. The cover or lid is placed to face the vehicle panel that forms the floor for the passenger compartment. These covers or lids are having an overall thickness distribution of between 0.2 mm to 10 mm while spanning large distances. Covers can easily go up to 3 m2 in size and may even be larger. In addition, the cover might not be a flat panel but shaped to enclose underlying geometries like for instance controlling or cooling systems for the battery management, or cable channels on the passenger cabin site.

One of the key performance indicators for traction batteries is the stored energy per weight unit. Therefore, there is a need for lighter battery housing structures, but a reluctance to replace the metal casing by a composite variant. The main problem with composites for battery packaging is that on the one hand, the materials known on the market are made from thermoset technology, which generates significant production waste and has to be land-filled at end-of-life of the battery housing. Thermoplastic solutions, on the other hand, can improve the sustainability performance, however technology known today has limited mechanical performance and it is prone to shrinkage and warpage.

There is a need for an alternative and more economical process, more readily applicable for panels that are able to cover large areas and that can meet high impact and temperature requirements without the problems of the current state of the art materials available on the market mentioned above.

SUMMARY OF THE INVENTION

The object of the present invention was therefore to provide a method for producing automotive panels, an automotive product comprising such a panel and the use of such panels as a cover or lid for a battery housing box, having high impact strength, enabling the production of larger panels with low warpage and shrinkage and enhanced mechanical features related to anisotropy optimisation.

In particular a method for producing an automotive panel is presented with the steps of (a) providing a first extrudate of polycarbonate and additives (mixture A), and providing endless filament glass rovings (component C), (b) feeding mixture A, and component C into the main extruder, and forming a final extrudate, (d) compression molding the final extrudate into an automotive panel characterized in that a second mixture of polycarbonate and short length glass fibers with an average fiber length of between 1-6 mm (mixture B) is fed together with mixture A and component C.

Preferably, further comprising the step of forming and portioning the final mixture in slabs that can be used for the adjacent compression-molding step.

The automotive panel might be formed to become a cover or lid for a battery housing using one or more slabs in a compression-molding tool on a molding press. However the panel might be also formed to be used as an underbody cover panel, an under engine panel, or a panel for underneath the rear area of the vehicle or a shell for a seat or a door panel.

The slabs may be pre-formed with a thickness distribution already anticipating the final shape and thickness distribution of the material in the final part. Multiple different formed slabs and/or weights might be used to cover a larger part like, for instance, a full battery housing cover, to compensate for extreme shapes or local material requirements. The slabs might be placed in the mold with the same or different directions among each other in the surface plane of the mold, to further compensate warpage and or shrinkage effects of the cooling material.

Therefore, the combination of polycarbonate forming a matrix with glass fibers would enable the use of such a panel in larger structures like needed for a battery housing cover, in particular for a traction battery, for a hybrid or battery electric vehicle, because polycarbonate can further limit the effects of shrinkage due to its phase behavior.

In the automotive application, it is essential that not only the average properties of a material show high performance, but also the minimum properties have good performance. This is why in many applications anisotropy is disfavored.

Surprisingly, the mixing of a compound with high concentration of short glass fibers into the direct long fiber thermoplastic material increases not only the bending performance of the final product but also the impact performance of the final product, due to the reduced anisotropy of the material in the panel. Furthermore, the replacement of a certain mass of long glass fiber by the same mass of short glass fiber, which is introduced in the direct long fiber thermoplastic material by a compound with high concentration of short glass fibers leads to improved impact strength measured against the preferred fiber orientation, while overall tensile properties, bending properties and impact properties are substantially maintained.

Preferably, the total glass content in the final product is between 20 and 35% by weight, whereby the ratio between long glass fibers (LGF) and short glass fibers (SGF) is between 2:1 and 1:2 based on weight.

The concentration of long glass fibers might be at least 10% by weight of the final product. To ensure better mixing conditions for the mixing of the final extrudate, it is preferred to use a concentrated short glass fiber content in mixture B. Preferably mixture B comprises at least between 50 and 75% by weight of short glass fibers.

Preferably, the short glass fibers and/or the glass rovings have an average fiber thickness of between 10 and 20 µm preferable between 14 and 18 µm.

The thickness of the long glass fibers might be different from the thickness of the short glass fibers.

Preferably long glass fibers are either applied as bulk glass fiber, but preferably, they are provided as endless glass rovings, which are either cut just before feeding to the main extruder and/or broken in the main extruder. Preferably, the long glass fibers have an average fiber length of between 10 and 15 mm for the bulk of the long glass fibers in the final product.

The short glass fibers preferably have an average fiber length of between 1 and 6 mm, preferably between 1 and 4 mm. The short glass fibers are supplied in mixture B This can be a premade mixture that is supplied in the form of pellets or sticks, whereby the maximal length of the pellet or the stick is related to the maximal length of the glass fibers it contains. Mixture B in the form of discrete particles, like pellets or sticks can be fed to mixture A and component C either directly as pellets or sticks, or after the pellets or sticks are molten either by a simple extruder or by applying a local heating device close to the dosing system to heat the stream dosed to the main extruder.

The combination of mixture A, B, and component C mixed together and molded to form the final product may have a density of between 1.3 and 1.5 g/cm$^3$.

Mixture A and B are both comprising polycarbonate based on a linear and/or branched aromatic polycarbonate or a linear and/or branched aromatic polyester carbonate.

Mixture A and/or B might further comprise a polymer based on at least one of acrylonitrile butadiene styrene (ABS), or a polyester such as polyethylene terephthalate (PET) or polybutylene terephthalate (PBT) or copolymers of these. By combining the polycarbonate with a second polymer from the group mentioned above, it is possible to optimize the viscosity during molding as well as the properties of the material during molding. In particular, the viscosity of the final extrudate might affect the press force needed to form the part. Surprisingly, the ratio between the long glass fibers and the short glass fibers can be used to further tune the viscosity during the press molding of the part without substantially modifying the mechanical product performance.

Preferably mixture A and/or B might further comprise a flame retardant, preferably one based on phosphorus compounds selected from the groups of monomeric and oligomeric phosphates and phosphonates, phosphate amines, phophazenes and phosphinates. A mixture of two or more components selected from one or more of these groups can also be used as flame retardant.

Alternatively, the flame retardant might be based on bromine, sulphur, and/or silicone. In addition, mixtures of the flame retardants mentioned might be used.

An alternative flame retardant alone or in combination with others might be bromoaromatic additives, such as tetrabromobisphenol-A which can be used as additive or as part of the polycarbonate. Other bromine additives used include brominated epoxy condensates and brominated polystyrenes or Sodium or potassium sulfonates, such as potassium perfluorobutylsulfonate, potassiumdiphenylsulfonesulfonate and sodium trichlorobenzenesulfonate.

However also a mixture with polycarbonate and poly (acrylonitrile butadiene styrene) (ABS) provides already an increase in flame retardancy and might need lower concentrations of additional flame retardant additives.

Preferably mixture A and/or B comprise an anti-dripping agent, for instance fluorinated polyolefin, or perfluorocarbon resin. Preferably, a reactive anti-dripping agent based on a chemical cross-linking agent is used which activated when the polymer reaches temperatures close to thermal degradation or burning, thus reducing the tendency to drip.

All components used for mixture A and or B might be obtained from recycling sources, such as end-of life of same or similar products. Also pellets or flakes produced by cutting up scrap material waste from the production line itself or a similar production might be added to the final mixture, depending on the content of the waste from 5% up to 50% by weight might be fed back into the process avoiding the scrap waste problem.

In one preferred embodiment, mixture A differs from mixture B such that mixture B is not fully mixed into mixture A during the final extrusion and forms discrete areas within mixture A in the final product. Surprisingly, this further enhanced the mechanical properties of the part.

To further enhance the binding of the glass fibers to the thermoplastic resin material and to optimize the mechanical properties of the part, the glass rovings and/or the short glass fibers may contain a chemical sizing to increase the adhesion between the glass fibers and the polycarbonate.

The final extrudate coming from the main extruder and comprising mixture A, B and the long glass fibers (component C) is formed in slabs. Preferably, the slabs are having areas with a predefined variable thickness and/or weight. By introducing such areas with a variable thickness and or weight in the slab, the different need of material within the molded product can be anticipated, for instance more in the rim than in the middle part of the product.

The final product might be formed by more than one slab. Preferably laid in more than one direction, which respect to each other along the plane of the mold surface.

The final product might comprise the molded panel according to the invention. In addition, it might comprise additional layers and or materials. For instance, additional layers might be placed within the mold before compression molding the part for instance a covering or deco layer that is during compression molding covering at least one of the surfaces of the final product. This additional layer might be one of an intumescent layer, a scrim layer, a film layer, an electromagnetic shielding film layer or a nonwoven layer and may be applied locally or on the full part. For instance, a glass fiber veil to further strengthen locally or the full part. Combinations of such layers may be added as well.

An alternative embodiment would be a part with an area with the material according to the invention comprising mixture A, B and long glass fibers and in addition a second area with a glass fiber mat impregnated with either mixture A or B alone or in combination.

The process would then include a step of placing a glass fiber mat in at least in one area of the mold before or after at least one slab of material is placed in the mold. In case mixture A or a mixture similar to A is used, it can also be applied as an injection molding material of the mixture directly on the glass fiber mat. Alternatively, pre-impregnated mats with the same or a different mixture based preferably on polycarbonate or on polyester preferably a copolyester might be used.

The process may include post-processing steps for instance including the step of treating at least one surface of the molded trim part with an additional layer of resin including a flame retarder, preferably applying an intumescent layer.

To further optimize the step of compression molding at least part of the mold is put at a temperature below the glass transition temperature of the slab, while the mold surface is kept at a temperature above the glass transition of the slab until the press is closed. Preferably, the surface of the mold is heated using at least one of electric heating, induction heating, pulse-heating with 2nd tempering liquid or infrared heating.

Preferably a glass fiber veil or fabric, optionally preheated is placed in the mold preferably on both sides before introducing the slabs, thereby enhancing the flow during compression molding of the part, resulting in a sandwich type structure of glass fiber outer layer and the material according to the invention as core.

An automotive cladding, shielding or cover comprising at least one automotive molded panel produced according to the invention.

The automotive cladding, shielding or cover might be made from a single layer of the material according to the invention comprising polycarbonate and glass fibers, and whereby the glass fibers consist of short glass fibers with a main average length of between 1 and 5 mm and long glass fibers with a main average length of between 10 and 15 mm.

Preferably, the glass fibers are between 20 and 35% by weight of the total weight of the panel, whereby the long glass fibers are at least 10% of the weight of the panel.

The covering cladding, shielding or covering might comprise an additional layer laminated to at least one surface being at least one of a decorative layer, electromagnetic shielding coating, or a metal layer. Alternatively, additional layers might be applied to the surface using other application technologies like, dipping, coating, spray coating, gluing or by the usage of films.

The panels according to the invention might be welded together to span an even larger area.

In one preferred embodiment the automotive panel according to the invention is formed in a cover for a battery housing for an automotive traction or main battery. Batteries for battery electric vehicles are large and heavy, and therefore preferably located underneath the vehicle, spanning up to the full surface of the floor of the passenger compartment. To even increase the available space for battery modules, the box might have stacks put on top, filling the space underneath the seats of the car and using a tunnel reaching from the front to the rear of the vehicle. Hence, the floor of the passenger compartment made of beams and flooring panels is having a shape to encompass the shape of the battery housing or case and enable a smooth shape of the housing or case underneath the car.

Therefore the cover for such a lid, placed between the battery housing and the lower surface of the passenger compartment floor is a very large part very often with a complex 3D shape.

Surprisingly the cover of such a large complex product might be formed from at least one automotive panel according to the invention. The panel can be immediately formed in the compression molding step and eventually additional layers might be added immediately during the molding step or afterwards in a separate molding or application step.

For instance, the inner side of the battery cover might be spray coated, melt coated or treated with a film to create an intumescent layer, to further enhance the flammability resistance of the cover.

Extreme shaped parts or covers might comprise more than one panel for instance thermally welded together.

BRIEF DESCRIPTION OF DRAWINGS

FIG. 1 shows a schematic overview of the method of producing the automotive panel according to the invention.

In a first step, endless filament rovings are prepared from a mixture A 100 comprising the thermoplastic matrix polymer and optional additives, mixture B 200 comprising a thermoplastic matrix polymer, optionally additives, and short glass fibers (SGF), and component C 300. Preferably, mixture A and/or B. are molten and mixed in a suitable device. for instance. an extruder 400. Depending on the mixture recipe used, a twin screw or mono-screw extruder is needed for eventually compounding and/or melting, or a simple heating device like for instance infrared lamp might be enough. Where needed the mixtures might be dried before starting the production process.

In the main extruder 400, all ingredients come together and are mixed to form the final extrudate 500. The endless filaments might be broken by the action of the extruder or might be cut just before feeding into the extruder 400.

At the end of the extruder 400, the formed mass is portioned in slabs 600. Preferably, the slabs 600 are preformed in a thickness profile or shape that suits the molding step 700.

The slabs 600 are transferred for instance with a robotic arm to the mold for compression molding the final part 800.

A part can be made of multiple slabs with the same or variable weight and/or thickness profile.

In the compression molding step 700, the slabs 600 are laid in predefined order and the mold is closed to form the final part 800. As in most cases for battery covers the part might be large, preferably variable temperature management of the mold temperature and/or sequential closing of the mold might be used to further enhance the flowing of the material within the mold.

If the part is too big for the available press or for any other reason the part can not be made in one piece, introducing a welding seam to combine multiple part might be an option.

Figure 1:
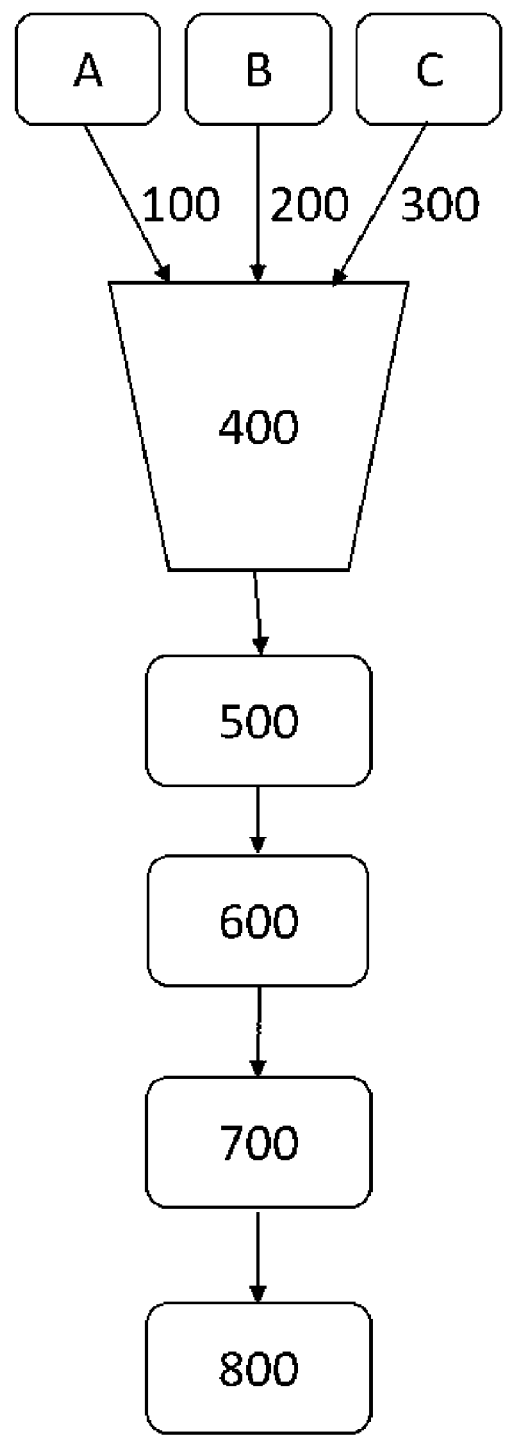
FIG. 1 is an overview of the process steps.
Figure 2:
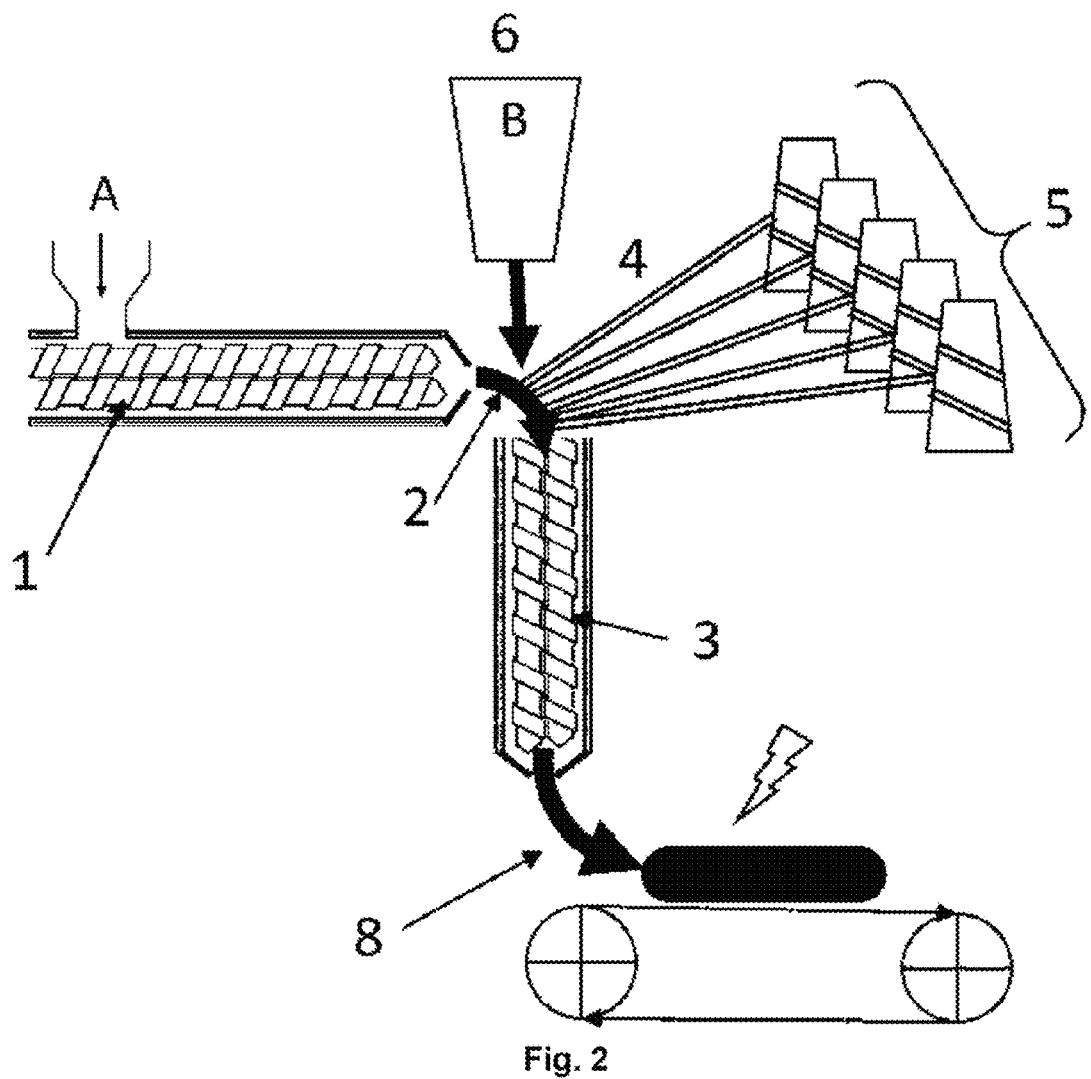
FIG. 2 is a schematic drawing of a part of the production process.

FIG. 2 shows a possible production layout in more detail. A first twin-screw extruder 1 obtains mixture A and heats and mixes mixture A to form a first extrudate 2. The first extrudate 2 is fed into a second extruder 3. By the fluid action of the first extrudate 2 coming from the first extruder 1, the endless glass filaments 4 provided as, for instance, as rovings on bobbins 5 are pulled into the second or main extruder 3. In the second or main extruder 3, the endless filaments 4 are broken into sections with an average size of between 10-15 mm of the bulk of the fibers formed and mixed into the extrudate 2. Alternatively, the rovings are cut or broken mechanically before feeding into the extrudate stream.

Either by a hopper 6 or via an additional extruder, mixture B. including short glass fibers is fed into the extrudate stream 2 coming from the first extruder 1.

Mixture B can be supplied in the form of pellets or sticks and directly fed into the extrudate stream 2 in the form given, or preheated and fed in a molten form. Mixture B is preferably fed close to or together with the endless filament and/or cut glass rovings.

Mixture A will be a polycarbonate mixture, preferably without glass fiber content. This will ensure a good mixing of the polycarbonate and any additives used, while maintaining the energy needed for mixing and melting low just as well as it will reduce the content of destroyed short glass fiber in the final product.

Mixture B will be a polycarbonate mixture with a concentrated amount of glass fibers, preferably 60 to 70%. This mixture should not necessarily need a twin-screw extruder, a single screw system just for melting the mixture would be enough. Preferably, the mixture is already provided in premade pellets or sticks and only needs melting and homogenization and may be provided directly to the main extruder 3.

Figure 3:
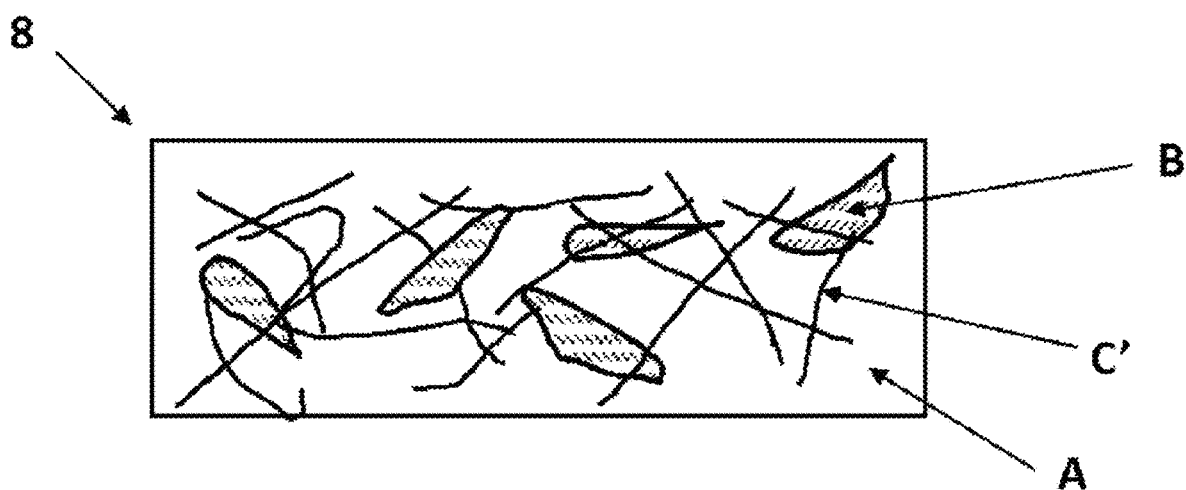
FIG. 3 is a cross section of the molded material according to the invention.

FIG. 3 shows a cross section of the material 8 according to the invention forming a battery cover or lid after molding in a preferred solution. Mixture A forms the continuous matrix throughout the part, while component C' in the form of broken or cut glass rovings forming long glass fibers (LGF) are reinforcing the thermoplastic resin to enhance the mechanical features like impact resistance and bending stiffness. However, due to the process and the molding conditions the LGF will be orientated mainly in the direction of the flow of the extrudate during molding, hence, an anisotropy would exist with LGF alone. In a preferred solution, mixture A and mixture B differ such that they are not 100% compatible. Hence, during the blending in the last extruder, mixture B forms discrete areas within mixture A, as these areas obtain a concentration of LGF and are formed randomly. Surprisingly, the overall mechanical performance of the part after molding is further enhanced. This effect can also be observed when mixture A and mixture B are perfectly compatible in theory, but mixing is not carried out to full extend in the second extruder so local fluctuations in short glass fiber density are observed in the final product. While the viscosity of the final extrudate with a 30% GF concentration is lower for a combination of LGF and SGF, compared to only LGF ensuring a good compression molding of larger parts and or a reduction in the press energy needed. Due to this surprising effect, it is possible to make the large parts needed for traction battery covers with a thickness distribution over the main area of between 2 and 4 mm. This results in a saving of energy, material and weight of part, while maintaining the mechanical properties needed for such a product.

Alternatively discrete pockets of mixture B within mixture A might be achieved with process conditions, like the starting temperature difference between mixture A and B and/or the blending conditions in the final extruder.

Figure 4:
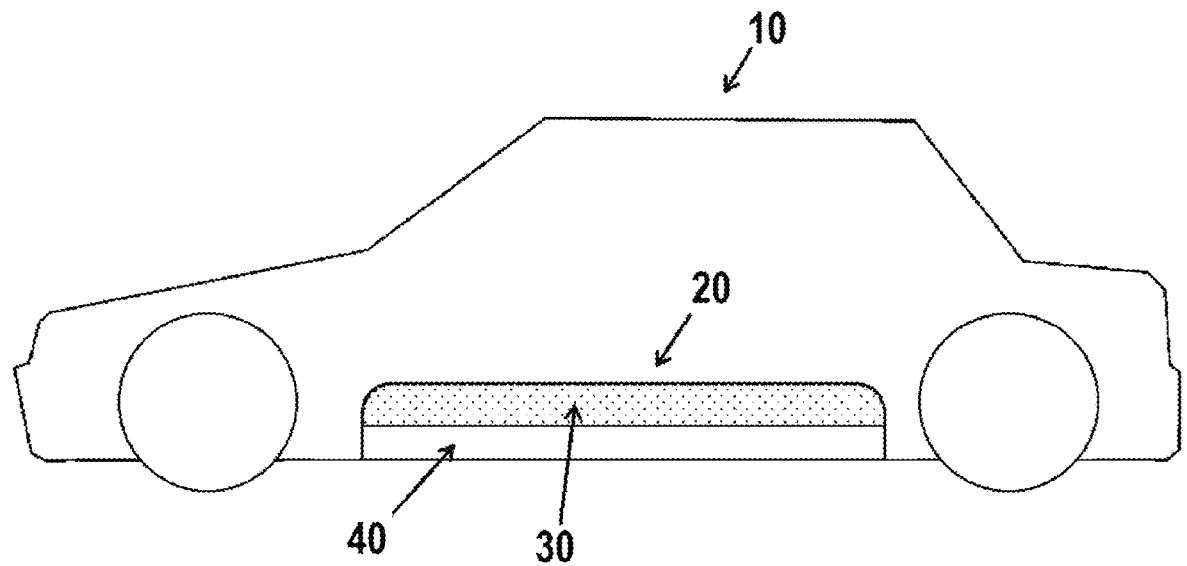
FIG. 4 is a schematic drawing of vehicle with battery.

FIG. 4 is an example of an automotive panel produced according to the invention as a battery box or housing 20 in a vehicle 10. The battery box or housing 20 comprises the power cell or cells (not shown) that may be needed for a battery electric vehicle (BEV) or a hybrid electric vehicle (HEV) for instance for electric cars and small people transporting units. The battery is used mainly as traction battery powering the main powertrain of the vehicle.

The battery box or housing 20 comprises an upper covering part forming a lid 30 made from the automotive panel according to the invention, and a lower part 40 containing the power cell or cells. Both fit together to form an enclosed space for the power cell or cells. Preferably the box is sealed with a sealing at the area of contact between the upper part and the lower part to prevent dirt and water from entering the box and get in contact with the content in particularly the power cells or the connections between the power cells. The lower part of the housing might be made of metal.

Figure 5:
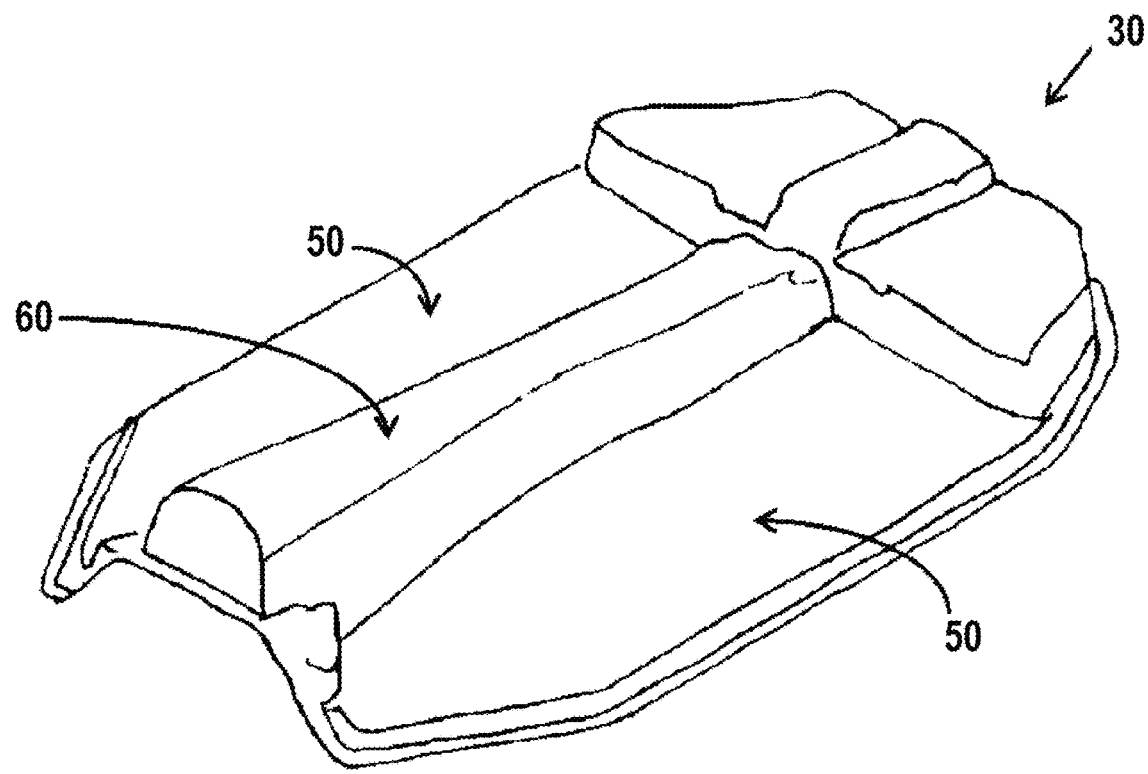
FIG. 5 is a schematic drawing of a cover for a battery according to the invention.

FIG. 5 shows the upper covering part forming a lid 30 for battery housing or box in more detail. The upper covering part comprises at least a thermoplastic carrier 60 according to the invention shaped to form the covering lid. The lid 30 is shaped such that it is able to cover at least the open space in the lower part comprising the power cell or cells. Whereby also contours 50 to cover other appliances might be given, for instance to cover additional cooling systems or connections. The battery cover might comprise any ribbing or beading to further increase the stiffness of the cover and/or to increase the impact durability.

The invention claimed is:

1. A method for producing an automotive panel, comprising:
   providing an extrudate comprised of polycarbonate and additives (mixture A);
   providing a mixture of polycarbonate and short length glass fibers (SGF) with an average fiber length of between 1-6 mm (mixture B);
   providing endless filament glass rovings (component C);
   feeding mixture A, mixture B, and component C into an extruder and forming a final extrudate, wherein the endless filament glass rovings are cut before feeding into the extruder and/or broken in the extruder to form long glass fibers (LGF) having an average fiber length of between 10 and 15 mm for a bulk of the long glass fibers (LGF) in the final extrudate; and
   compression molding the final extrudate into an automotive panel.

2. The method according to claim 1, whereby total glass content in the final extrudate is between 20 and 35% by weight and a ratio between long glass fibers (LGF) and short glass fibers (SGF) is between 2:1 and 1:2.

3. The method according to claim 1, whereby a concentration of long glass fibers (LGF) is at least 10% by weight of the final extrudate.

4. The method according to claim 1, whereby mixture B comprises at least between 50 and 75% by weight of short glass fibers (SGF).

5. The method according to claim 1, whereby mixture A and/or B further comprises at least one of acrylonitrile butadiene styrene (ABS) or a polyester.

6. The method according to claim 1, whereby mixture B is not fully mixed into mixture A when forming the final extrudate, wherein mixture B forms discrete areas within extrudate A in the final extrudate.

7. The method according to claim 1, whereby the filament glass rovings and/or the short glass fibers are sized to increase adhesion between the glass fibers and the polycarbonate.

8. The method according to claim 1, whereby the long glass fibers and/or the short glass fibers have an average fiber thickness of between 10 and 20 μm.

9. The method according to claim 1, whereby the short glass fibers have an average length between 2 and 5 mm.

10. The method according to claim 1, whereby mixture B is in the form of pellets and/or sticks.

11. The method according to claim 1, whereby the final extrudate is formed in slabs with predefined variable thickness and/or weight.

12. The method according to claim 11, whereby at least part of the mold is at a temperature below the glass transition temperature of the slab, while a mold surface is kept at a temperature above the glass transition of slab until the mold is closed, wherein the surface of the mold is heated using at least one of electric heating, induction heating, pulse-heating with a tempering liquid, or infrared heating.

13. The method according to claim 1, whereby at least one of a glass fiber mat, veil, or fabric is placed at least in one area of the mold before and/or after at least one slab of material is placed in the mold.

14. The method according to claim 1, including the step of treating at least one surface of the automotive panel an additional layer of resin, including a flame retarder, an intumescent layer, and/or laminating one or more layers to the automotive panel.

15. The method according to claim 1, whereby mixture A and/or B further comprises at least one flame retardant comprised of a phosphorus compound selected from a group of monomeric and oligomeric phosphates and phosphonates, phosphonate amines, phophazenes, and phosphinates, a bromine-based, sulphur-based, and/or silicone-based flame retardant, or a mixture thereof.

16. The method according to claim 1, wherein the automotive panel is a first automotive panel, providing a second automotive panel produced according to the method of claim 1, and welding the first automotive panel and the second automotive panel to form a large automotive panel.

* * * * *